Dec. 24, 1946.    F. E. REAGAN    2,413,069
LUBRICATION
Filed Oct. 23, 1943
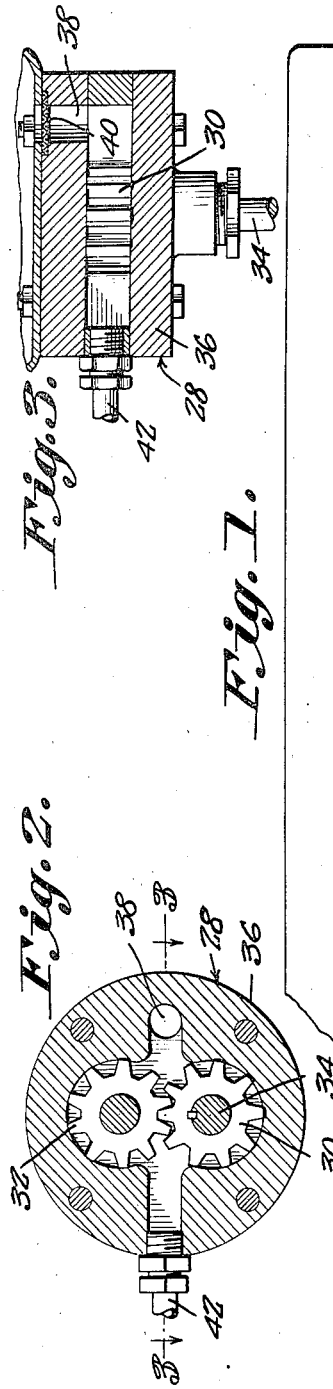
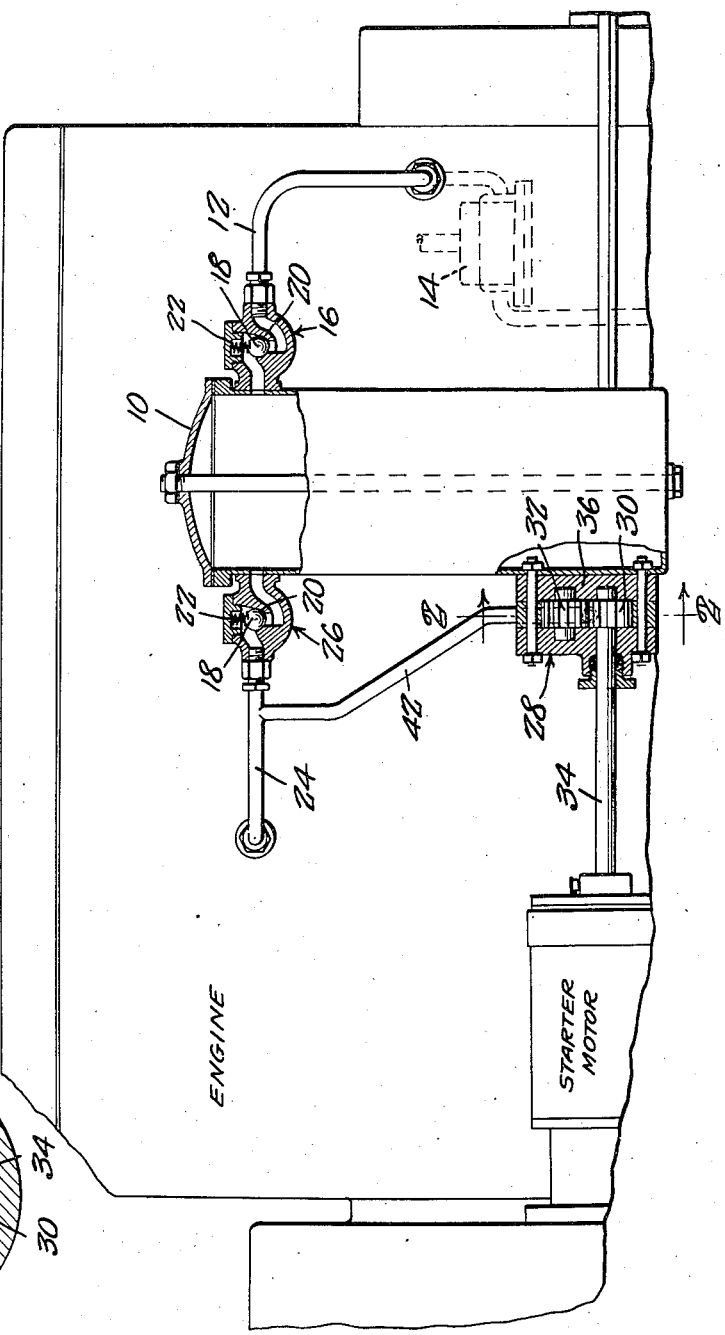
INVENTOR,
*Fred E. Reagan*
BY
*Victor J. Evans & Co.*
ATTORNEYS Patented Dec. 24, 1946

2,413,069

UNITED STATES PATENT OFFICE 2,413,069

LUBRICATION

Fred E. Reagan, Knoxville, Tenn.

Application October 23, 1943, Serial No. 507,445

1 Claim. (Cl. 123—196)

My invention relates to internal combustion engines of the type employed in automotive vehicles, and has among its objects and advantages the provision of an improved auxiliary oiling system designed to operate while the engine is being started so as to effectively circulate the lubricating oil during the starting period and before the regular oiling system is brought into full operation.

In the accompanying drawing—

Figure 1 is a diagrammatic and sectional view illustrating my invention applied to an engine.

Figure 2 is a sectional view along the line 2—2 of Figure 1, and

Figure 3 is a sectional view along the line 3—3 of Figure 2.

In the embodiment of the invention selected for illustration, I make use of a quart size oil filter 10 so that a convenient and constant reserve supply of filtered oil is available and which has a pipe 12 leading into its upper end and communicating with the usual oil pump 14. A check valve 16 is interposed in the pipe 12, which valve includes a ball element 18 yieldingly held against its seat 20 by a spring 22. This valve is set to open at a pressure of twenty pounds.

The filter 10 is provided with an outlet pipe 24 leading to the lubricating system of the engine. This pipe is provided with a check valve 26 similar to the valve 16 and set to open at a pressure of thirty pounds to pass lubricant from the filter to the pipe 24. An auxiliary oil pump 28 is attached to the filter 10 at one side thereof and near its bottom. This pump is of the gear type and includes the usual two gears 30 and 32. The gear 30 is fixed to the starter motor shaft 34, and the housing 36 of the pump has communication with the filter 10 through the medium of a port 38, this port being provided with a filter 40, see Fig. 3. An outlet pipe 42 leads from the pump 28 to the pipe 24.

In operation, the auxiliary pump 28 is operated at a high speed during starting of the engine because of the relatively high speed of the starter motor. Such operation of the auxiliary pump takes oil from the filter 10 and delivers the oil under pressure to the pipe 24 for delivery to the lubricating system of the engine. The check valve 26 prevents the oil placed under pressure by the pump 28 from passing to the filter.

As soon as the engine has started, the check valve 16 is opened, the filter 10 is replenished with lubricating oil and the valve 26 opened to pass the oil directly to the pipe 24.

For practical reasons such as available space the engine oil pump and the conduits connected thereto must be positioned below the point of connection between the pump outlet conduit and the upper part of the filter chamber. This creates the possibility of lubricant drainage from the pump and connected conduits, preventing prompt supplying of lubricant to the bearings upon engine starting. By my particular arrangement however, initial lubrication is provided upon starting the engine.

Without further elaboration, the foregoing will so fully explain my invention, that others may, by applying current knowledge, readily adapt the same for use under various conditions of service.

I claim:

In an internal combustion engine, the combination of an oil filter chamber, an engine oil pump having an outlet conduit communicating with the upper part of said chamber, said outlet conduit and engine oil pump extending downwardly from the point of communication, a starter motor, an auxiliary pump having communication with the lower part of said chamber to receive lubricant by gravity therefrom, said auxiliary pump being connected for operation by said starter motor, a second conduit connected to the upper part of said chamber and leading to the oiling system of the engine, a third conduit leading from said auxiliary pump to said second conduit, and a check valve interposed in said second conduit between said third conduit and the oil chamber and opening only in response to oil under pressure from said first mentioned pump.

FRED E. REAGAN.